United States Patent [19]
Smith

[11] Patent Number: 5,360,035
[45] Date of Patent: Nov. 1, 1994

[54] PRESSURE BALANCED POPPET VALVE FOR HYDRAULIC COUPLINGS

[75] Inventor: Robert E. Smith, Missouri City, Tex.

[73] Assignee: National Coupling Company, Inc., Stafford, Tex.

[21] Appl. No.: 82,767

[22] Filed: Jun. 25, 1993

[51] Int. Cl.⁵ .................................................. F16L 37/28
[52] U.S. Cl. ........................... 137/614.04; 137/614; 251/149.7; 251/324
[58] Field of Search .......... 137/614.04, 614, 614.01, 137/614.02, 614.03, 614.05, 315; 251/149.6, 149.1, 149.7, 321, 324

[56] References Cited

U.S. PATENT DOCUMENTS

| | | | |
|---|---|---|---|
| 2,729,241 | 1/1956 | Clark | 251/324 X |
| 3,049,148 | 8/1962 | Richardson | 137/614.04 X |
| 3,374,985 | 3/1968 | Gessic | 137/614.04 X |
| 4,036,467 | 7/1977 | Dalton | 251/324 X |
| 4,074,702 | 2/1978 | Lewis | 251/324 X |
| 5,099,882 | 3/1992 | Smith, III | 137/614.04 |

*Primary Examiner*—Martin P. Schwadron
*Assistant Examiner*—Kevin L. Lee
*Attorney, Agent, or Firm*—Arnold, White & Durkee

[57] ABSTRACT

An undersea hydraulic coupling having a poppet valve movable between an open and a closed position is disclosed. The poppet valve operates without substantial fluid pressure exerted axially against the face of the poppet valve. When the poppet valve is opened, radial passages are interconnected through an annular cavity between the poppet valve body and the valve bore.

13 Claims, 4 Drawing Sheets

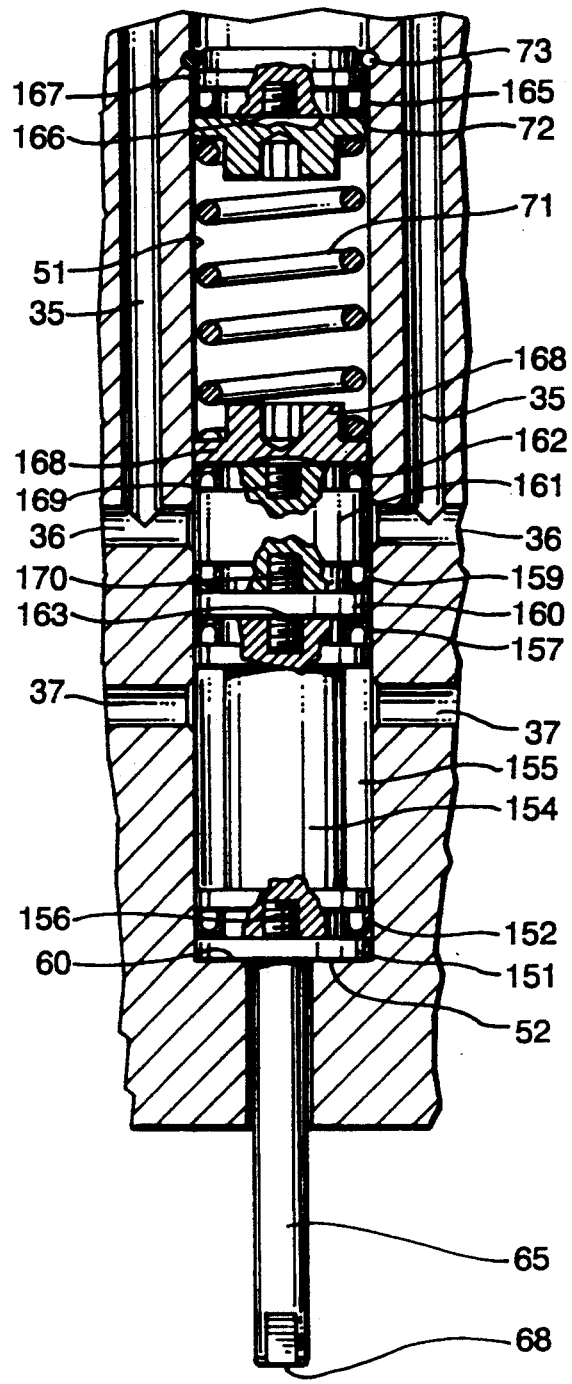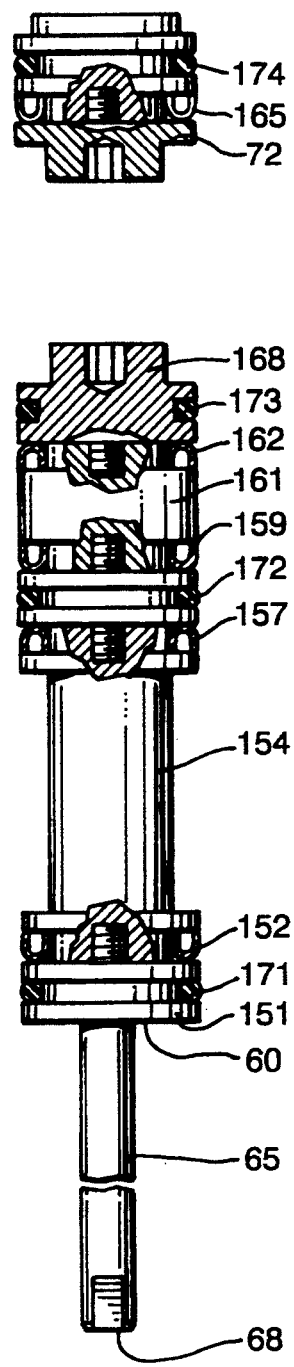

PRESSURE BALANCED POPPET VALVE FOR HYDRAULIC COUPLINGS

BACKGROUND OF THE INVENTION

1. Field of the Invention

This invention relates, in general, to hydraulic couplings, and specifically to hydraulic couplings used in undersea drilling and production applications. More particularly, the invention involves pressure balanced poppet valves for couplings wherein passages are positioned to allow connection or disconnection of the coupling and opening and closing the poppet valves in each member without substantial fluid pressure exerted axially against the face of each poppet valve.

2. Description of the Related Art

Subsea hydraulic couplings are old in the art. The couplings generally consist of a male and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

Problems arise with the use of hydraulic couplings in relatively high pressure systems due to the high axial forces imposed on the male and female members during the coupling operation and during their use. In such couplings, it is necessary for the fluid force opposing the face of the male or female member to be overcome and the fluid force on each valve member to be overcome before fluid communication is established between the members. In a relatively high pressure system, high forces imposed on the members and the valves in the members may render the connection of the male member very difficult. Also, during use, fluid pressure is exerted between the male and female members in such as way as to tend to separate them. The force necessary to join the members, and open the valves in each member, and the resultant tendency of the body members to separate and urge the valves closed are characteristic problems in the prior art. High pressure systems and undersea applications also experience problems associated with sealing the junction between the male and female members.

Ideally, hydraulic couplings should, as far as possible, be pressure balanced, so that fluid pressure does not hinder connection, urge separation of the male and female members, or urge the valves towards the open or closed position. Preferably, to prevent loss of fluid during coupling or uncoupling, the valve means in each member opens automatically on coupling and closes automatically on uncoupling. Finally, the coupling should employ seals which can withstand high pressures as well as the corrosive effects of undersea or other adverse environments. The present invention solves all of these needs and requirements.

In U.S. Pat. No. 4,754,780 to Robert E. Smith III, a pressure-balanced hydraulic coupling is disclosed, wherein fluid communication between the male and female coupling members is through radial fluid passages in the members. In U.S. Pat. No. 4,694,859 to Robert E. Smith III, an undersea hydraulic coupling and metal seal is shown. The metal seal is ring-shaped and is pressure energized to seal radially between the female member and the outer surface of the male member. In U.S. Pat. Nos. 4,832,080 and 5,099,882 to Robert E. Smith III, pressure-balanced hydraulic couplings with metal seals are disclosed. Like the coupling in U.S. Pat. No. 4,754,470, fluid communication is through radial fluid passages in the male and female members. Metal seals are positioned between the circumference of the male member and the central bore of the female member, such that the radial fluid passages are between the seals. U.S. Pat. Nos. 4,754,780, 4,694,859, 4,832,080, and 5,099,882 are incorporated herein by reference.

SUMMARY OF THE INVENTION

The present invention resides in a hydraulic coupling of the foregoing type, including male and female members for fluid communication therebetween such that fluid passages are mutually positioned to allow connection or disconnection of the coupling without substantial fluid pressure exerted axially against the face of the poppet valves in each member. The fluid passages are mutually positioned so as to substantially prevent separation forces against the members or against the poppet valves when the members are pressurized by fluid.

The fluid communication between the male and female members in the present invention preferably is established between a radial passageway at the outer longitudinal surface of the male member and a matching radial passageway in the side wall of the receiving chamber of the female member. When the male member is fully inserted into the receiving chamber of the female member, fluid communication between the two members is established through the matched radial passageways. The leading faces of mutually opposed valve actuators in the two members come into contact with one another, and thereby urge poppet valves in the respective members into the open position. When in the open position, fluid may flow through annular cavities in the poppet valves and through the radial passageways inboard of the poppet valves, without significant fluid pressure against the leading face of each poppet valve.

One or more seals are positioned to form a fluid-tight seal on each side of the annular cavity in each poppet valve. When the poppet valves are opened, each of the annular cavities is positioned to allow fluid flow through a pair of radial passages in each member.

BRIEF DESCRIPTION OF THE DRAWINGS

FIG. 6 is a section view of a poppet valve according to a second embodiment of the invention.

FIG. 7 is a section view of a poppet valve according to a third embodiment of the invention.

DETAILED DESCRIPTION OF PREFERRED EMBODIMENTS

Figure 1:
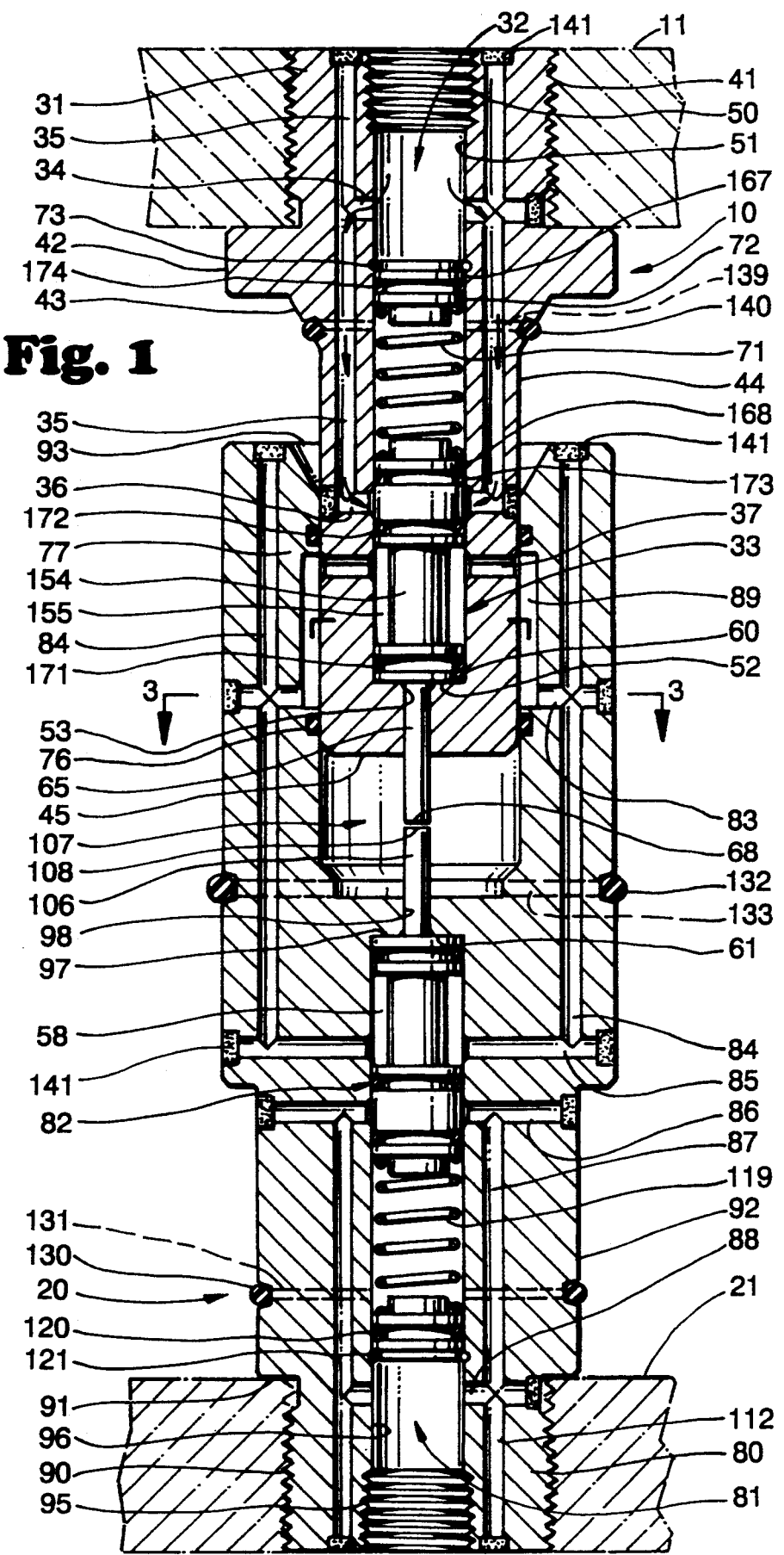
FIG. 1 is a section view of the male member partially inserted into the female member of a coupling according to a first embodiment of the invention.

The coupling of FIG. 1 comprises a male member 10, a female member 20 and fluid passageways establishing fluid communication between the male member and female member when the male member is inserted into the female member. The fluid communication is established without significant pressure exerted against the face of the male member during or after insertion or against the leading faces 60, 61 of either of the poppet valves at any time. The fluid communication between the male member and female member is established radially via a passageway in the outside longitudinal surface of the male member to a corresponding radial fluid passageway in the receiving chamber of the female member. The fluid communication in the poppet valves is radially through annular cavities in each of the valve bodies.

Figure 2:
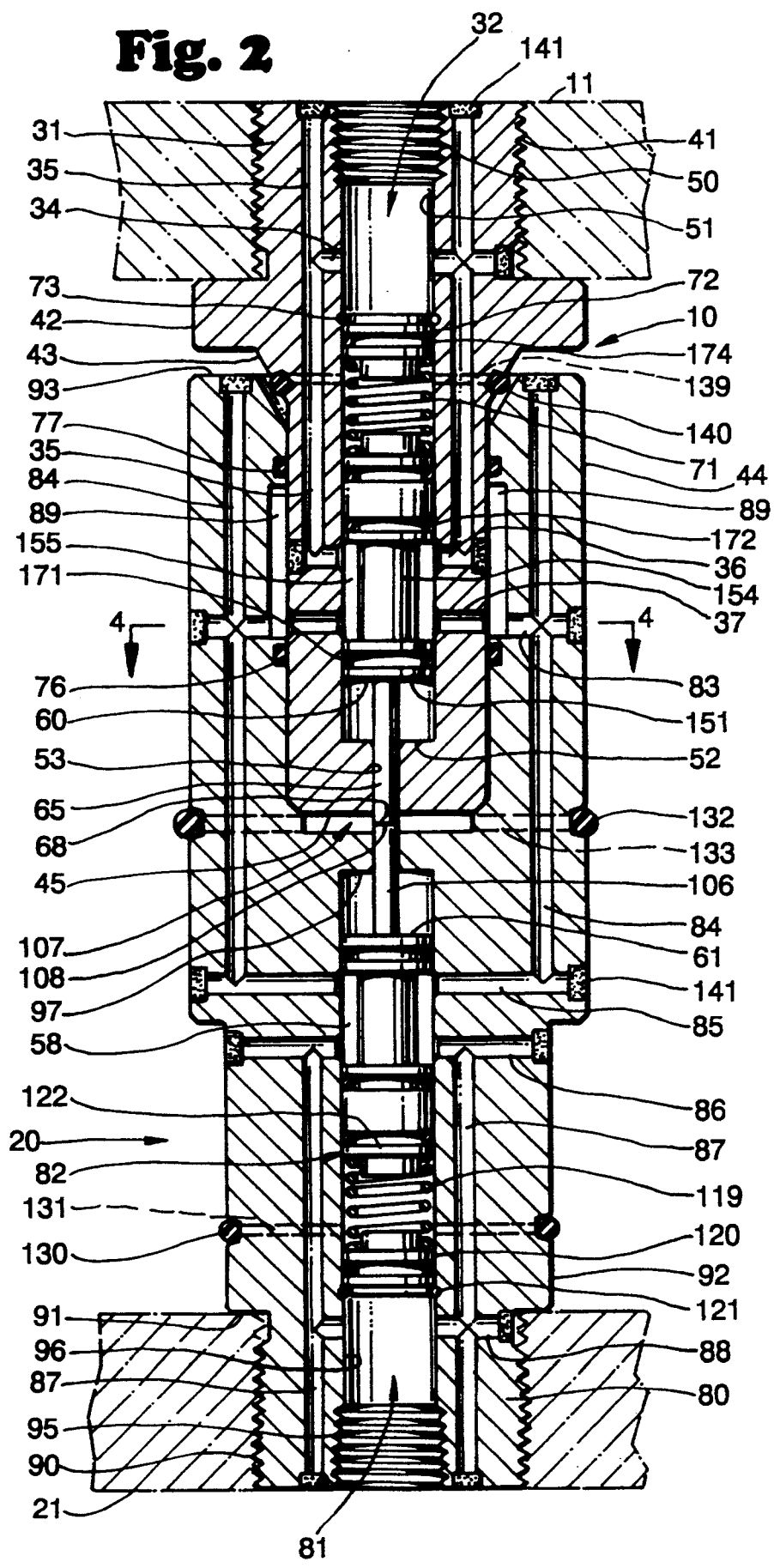
FIG. 2 is a section view of the male member fully inserted into the female member of a coupling according to a first embodiment of the invention.
Figure 3:
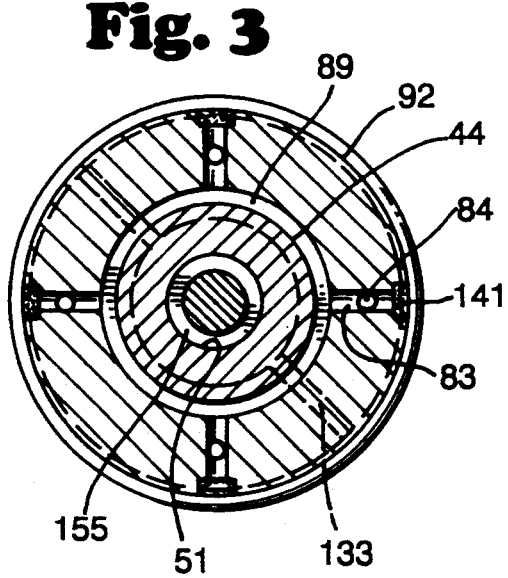
FIG. 3 is a cross-section view of the coupling along lines 3—3 of FIG. 1.

In FIGS. 1 and 2, the male member 10 comprises a body 31, a central bore 32, a poppet valve assembly 33, and fluid passages 34–37. The body 31 of the male member may be threaded or otherwise connected to a manifold plate 11. The male member 10 and female member 20 are generally connected to opposing plates of a manifold and are held together by bolts or hydraulic members attached to the plates of the manifolds. The male member is commonly attached to one plate 11, while the female member is attached to an opposing plate 21 so as to face the male member and align with it. The male and female members may be attached to the manifold plates using various means, such as set screws or threads. Techniques for attaching the members to such manifold plates are well known to those skilled in the art.

The male member 10 includes a handle 41 which terminates at flange 42 of male member and tapered shoulder 43. The shoulder 43 is tapered down to the first end of the cylindrical probe wall 44 which terminates at probe face 45. The cylindrical probe wall 44 is adapted for sliding engagement with the female member, as will be discussed below. The body 31 of the male member, which is cylindrical in shape, thus includes handle 41, flange 42, shoulder 43, probe wall 44, and probe face 45.

The body of the male member also is provided with a central bore 32. The bore 32 may have several variations in its diameter as it extends through the body of the male member 10. In a preferred embodiment, the first end of the central bore comprises an internally threaded section 50 for connection to a hydraulic line. Adjacent and inboard of the threaded section is a cylindrical passageway 51 extending longitudinally within the male member body and terminating at internal shoulder 52. Extending axially from the shoulder is cylindrical passage 53 having a reduced diameter which is a receiving bore for valve actuator 65. The valve actuator bore 53 is narrower than the cylindrical passageway 51 for receiving the valve actuator 65 slidably therethrough.

Figure 5:
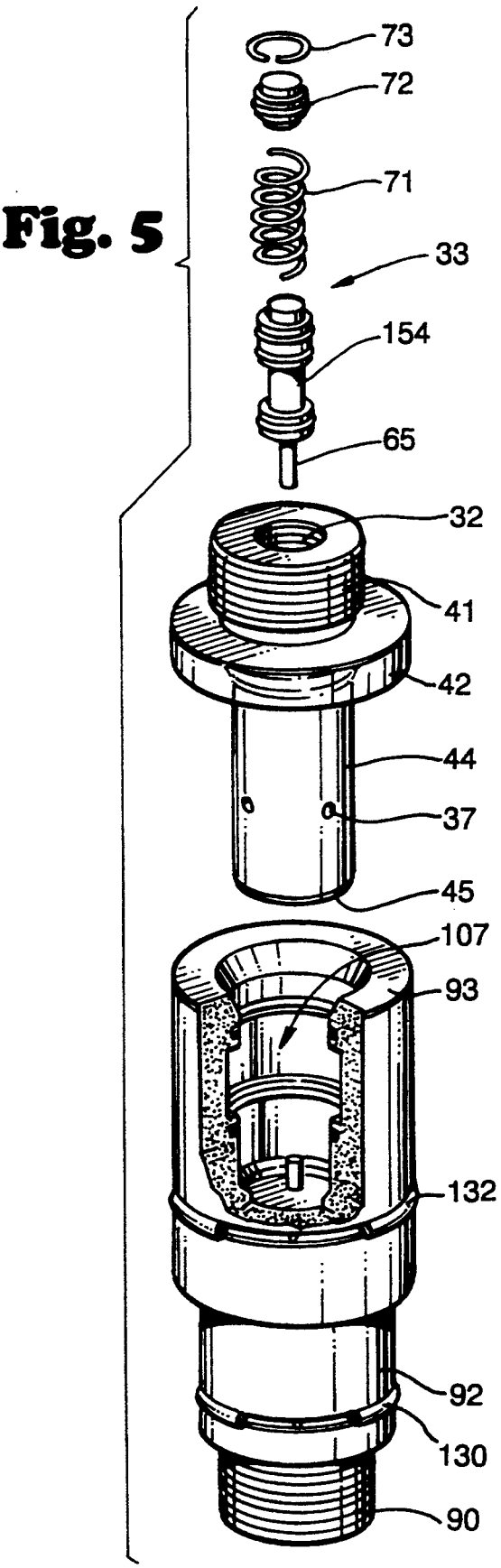
FIG. 5 is an exploded perspective view of a coupling according to a first embodiment of the invention.

As shown in FIGS. 1 and 2, the poppet valve assembly 33 is slidably received within the central bore 32 of the male member. The various components of the poppet valve assembly of the male member also are shown in FIGS. 5–7.

In the first embodiment, as shown in FIGS. 1–2, poppet valve assembly 33 seals against bore 51 with a plurality of O-rings 171–174. In the preferred embodiments, O-rings 171–174 are positioned in grooves in the poppet valve body. O-rings 171 and 172 seal annular cavity 155 during fluid flow therethrough. O-ring 174 seals and blocks cylindrical passageway 51 so that hydraulic fluid is diverted into radial passage 34. When the popper valve is in the closed position, O-rings 172 and 173 seal each side of radial passage 36 to prevent fluid flow through the annular cavity 155. When the poppet valve is in the open position, fluid flows into radial passage 36, through annular cavity 155, and out through radial passage 37. The poppet valve assembly thus blocks fluid flow through the central bore and diverts fluid flow to passages 34, 35, 36.

In the second embodiment shown in FIG. 6, pressure energized metal C-ring seals are used instead of O-rings shown in FIGS. 1–2. To facilitate the use of pressure energized metal C-ring seals, the poppet valve assembly, spring collars and spacers are interconnected with set screws. Spacer 167 blocks fluid flow through the central bore, and is connected to spring collar 72 with set screw 166, and metal C-ring seal 165 is positioned therebetween to seal against bore 51. Similarly, spring collar 168 is connected to spacer 161 using set screw 169, with metal C-ring seal 162 therebetween, which seals with bore 51. Spacer 161 is attached to spacer 160 using set screw 170, and metal C-ring seal 159 is positioned therebetween. Spacer 160 is attached to spacer 154 with set screw 163, and metal C-ring seal 157 is positioned therebetween. Spacer 154 has a narrowed diameter to provide annular cavity 155 for fluid passage therethrough when the poppet valve is open. Spacer 154 is connected to spacer 151 with set screw 156, and metal C-ring seal 152 is positioned therebetween to seal with the bore. Thus, the embodiment shown in FIG. 6 provides a poppet valve assembly that is sealed with bore 51 using metal C-ring seals capable of withstanding high pressures during use.

Now referring to FIG. 7, a third embodiment of the poppet valve assembly used in the present invention is shown. In the third embodiment, metal C-ring seals and elastomeric O-rings are used in combination to seal the poppet valve with bore 51. Thus, each of the elastomeric O-ring seals 171–174 are used as backup seals for each corresponding C-ring seal. The O-rings used in the embodiment shown in FIG. 5 are positioned in essentially the same axial locations as in the embodiment of FIGS. 1–2, and the metal C-ring seals are positioned in essentially the same axial locations as shown in FIG. 6.

Helical valve spring 71 urges the poppet valve into a closed position against shoulder 52. The helical valve spring 71 is located within cylindrical passageway 51 and is anchored by hollow spring collar 72 which is held in place using collar clip 73. The opposite end of the helical valve spring 71 is held by spring collar 168.

When the poppet valve is in the closed position against shoulder 52 as shown in FIG. 1, the poppet valve assembly 33 seals fluid off from entering radial passage 36 of the male member. Annular probe seals 76 and 77 are situated about the circumference of the female receiving chamber and are used to seal off fluid from escaping at the upstream or downstream side of the radial passageways in the male and female members.

The inboard probe seal 76 and outboard probe seal 77 thus help assure that fluid flow is directly and radially between the male member 10 and the female member 20. The probe seals 76 and 77 may be elastomer O-ring type seals, or equivalent, or may be metal seals which are pressure-energized to seal the annulus between the male and female members.

As shown in FIG. 2, the valve assembly 33 of the male member 10 and the valve assembly 82 of the female member 20 are each urged into the open position when the valve actuator face 68 of the male member contacts the mutually opposed valve actuator face 108 of the female member. Fluid then may flow through the male member 10 via the central bore 32, radial passageway 34, longitudinal passageway 35, radial passageway 36, annular cavity 155, and radial passageway 37. Fluid flow is thus directed into the radial passageway 85 of female member 20 between the inboard and outboard probe seals 76 and 77.

Although the preferred embodiments show a longitudinal passage 35 generally parallel to the central bore 32, it should be recognized that this passage may be at an angle with respect to the central bore. It may be sloped inwardly to communicate with the central bore near the threaded section 51, thus eliminating the need for a separate radial passage 35.

The female member 20 comprises a body 80, a central bore 81, a poppet valve assembly 82, and passageways 83–88 for fluid flow therethrough. The body 80 of the female member includes handle 90 which is optionally threaded to manifold plate 21. Female member body 80 also includes an external shoulder 91 which is adjacent handle 90 and wall 92 which terminates at female member face 93. The central bore 81 has several variations in its diameter as it extends through the body 80 of the female member 20. At a first or outer end of the central bore 81 is a threaded internal passageway 95 for connection to a threaded hydraulic line. The threaded portion 95 of the central bore 81 terminates at cylindrical passageway 96 which slidably receives poppet valve assembly 82. Cylindrical passageway 96 terminates at internal shoulder 97, and connects to valve actuator bore 98 which slidably receives valve actuator 106 of poppet valve assembly 82. Adjacent the valve actuator bore 98 is a cylindrical receiving chamber 107 which slidably receives the probe of the male member 10. As shown in FIG. 2, when the face 68 of the valve actuator 65 of the male member 10 and the mutually opposed face 108 of the valve actuator 106 of the female member 20 are slidably engaged in contact with one another, poppet valve assemblies 33, 82 are forced into open positions for fluid flow between the passageways in the male and female members.

The poppet valve assembly 82 of female member 20 is substantially similar to the valve assembly 33 of the male member 10. Poppet valve assembly 82 is sealed with female member bore 96 using elastomeric O-rings, pressure energized metal C-ring seals, or both. When O-ring seals are used, as shown in FIGS. 1–2, the O-rings are inserted in outer grooves in the poppet valve body. When metal C-ring seals are used, each seal is positioned between spacers which are interconnected with set screws. Fluid flows through the annular cavity 58 in the poppet valve body when the valve is opened.

The poppet valve assembly of the female member is urged closed against shoulder 97 by helical valve spring 119. Helical valve spring 119 is mounted between spring collars 120, 122. Collar clip 121 anchors spring collar 120 in bore 96. When each valve is in an open position wherein the mutually opposed faces 68, 108 of the two valve actuators are in contact with each other as shown in FIG. 2, the helical valve spring bias is insufficient to keep the valves in the closed position. The passageways for fluid communication between the male member and the female member thereby allow fluid flow without any significant pressure exerted on the leading face 45 of the male member 10 or on the leading faces 60, 61 of either poppet valve 33, 82.

The fluid passageways in the female member 20 comprise radial passageways 83, 85, 86, and 88 and longitudinal passageways 84, 87 connecting between the radial passageways. When the male member 10 is fully inserted within the female member 20, the radial passageway 37 at the outer circumference of the probe wall 44 of the male member 10 matches radial passageway 83 of the female member 20 for fluid flow therebetween. An annular slot 89 cut about the circumference of the receiving chamber 107 of the female member 20 makes it possible to obtain fluid communication between the male and female members without precise alignment of the male member and the female member or exact rotational orientation of the male member with respect to the female member. The inboard and outboard probe seals 76, 77 in the sides of the receiving chamber 107 of the female member 20 seal off fluid flow except between the respective radial passageways 37, 83 of the male and female members. Fluid flow at the point of contact between the male and female members is perpendicular to the longitudinal axis of the male and female members where the radial passageway 37 of the male member 10 and radial passageway 83 of the female member 20 communicate. Thus, there is substantially no longitudinal force exerted by the fluid as it passes between the male and female members.

A cross-section view, taken along the plane referenced 3—3 in FIG. 1, shows the fluid passages of the first embodiment of the coupling in FIG. 1. As shown, four radial passages 83 extend between annular slot 89 and the wall 92 of the female member. It will be recognized that any number of fluid passageways 83 may be used according to the present invention depending on the fluid flow characteristics desired.

Figure 4:
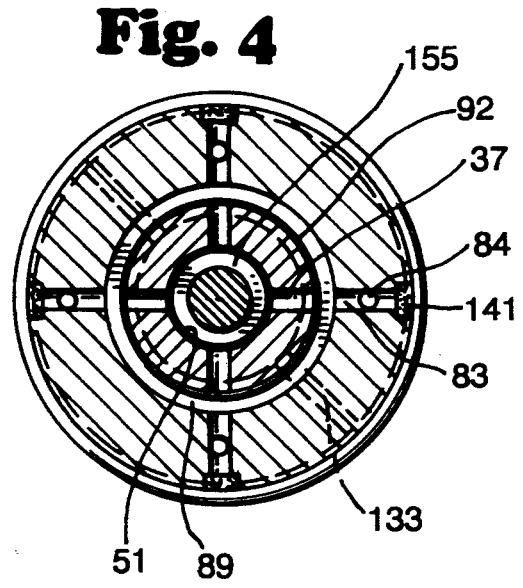
FIG. 4 is a cross-section view of the coupling along lines 4—4 of FIG. 2.

Now referring to FIG. 4, a cross-section view taken along the plane referenced 4—4 in FIG. 2 is shown. The four radial passages 83 in the female member are shown, when the poppet valves are opened, in alignment with the four radial passages 37 in the male member. Although four passages are preferred, any number of radial fluid passageways may be used depending on the fluid flow characteristics desired.

Preferably, when the male member is inserted into the female member, each radial passageway 37 of the male member 10 will match a separate second radial passageway 83 of the female member 20, so that the passageways are mutually positioned to facilitate fluid communication between the members. However, the annular slot 89 permits rotation of the male member 10 relative to the female member 20 and axial movement of the male member 10 relative to the female member 20 while maintaining radial fluid communication therebetween.

Fluid flow through the poppet valve assemblies is perpendicular to the longitudinal axis of the poppet valves. Thus, there is substantially no longitudinal force exerted by the fluid as it passes through each poppet valve. There is no fluid pressure against the leading face 60 of the male member poppet valve or the leading face 61 of the female member poppet valve. Thus, the poppet valves are not subject to longitudinal forces urging the valves open or closed during coupling or uncoupling.

Manufacture of the male and female members involves machining or drilling of the fluid passageways therethrough. Because the radial sections and longitudinal sections of the fluid passageways are machined or drilled in the members, the passageways extend through to the outer circumference of each member and to the face of each member, respectively. These extensions of the radial and longitudinal fluid passageways are sealed with plugs 141 to prevent loss of fluid. It will be understood that these passageway extensions and the corresponding plugs 141 are not essential to the inventive concept. If another manufacturing technique for producing the device, such as casting, is employed, the passageway extensions and plugs 141 would not be required and may not be present.

Each of the poppet valves is pressure balanced. As described above, the annular cavities 155, 58 are sealed with O-ring seals, metal C-seals, or some combination thereof, to prevent fluid leakage when the poppet valves are open. Similarly, O-ring seals, metal C-ring seals, or combinations thereof are used to seal the poppet valves with the respective bores of the male and female members.

As shown in FIGS. 1–5, the female member 20 further includes vent passages 131, 133 for expelling water from the bore 81 and receiving chamber 107 respectively. Each vent passage 131, 133 connects with the outer wall 92 of the female member. Annular vent hole seals 130, 132 are used to allow fluid flow only outwardly from the bore 81 and receiving chamber 107 when the male member is inserted into the female member and fluid is urged out of the receiving chamber 107, and when poppet valve 82 opens to urge fluid out of bore 81.

Similarly, the male member 10 further includes vent passage 139 for expelling water from bore 32 when the poppet valve 33 opens. The vent passage 139 extends between bore 32 and the outer wall 44 of the male member. Annular vent hole seal 140 allows fluid flow only outwardly from the bore 32.

As the present invention is adapted for subsea use, separation of the male and female members underwater allows the entry of seawater into receiving chamber 107 and bores 32, 81 of the members. Although this seawater is prevented from entry into hydraulic lines because of poppet valves 33, 82 and their seals, when the male member 10 begins to enter the receiving chamber 107, a hydraulic "lock" may develop within the chamber to prevent adequate entry of the male member. The vent passages provide means for the trapped seawater to be forced from the receiving chamber 107 and bores 32, 81 upon entry of the male member and opening of the poppet valves.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. An undersea hydraulic coupling, comprising:
   (a) a female member having a receiving chamber, and having a central bore for slidably receiving a poppet valve therein, and at least one pair of radial fluid passages extending into the central bore;
   (b) a male member insertable into the receiving chamber, and having a central bore for slidably receiving a poppet valve therein, and at least one pair of radial fluid passages extending into the central bore;
   (c) a poppet valve in at least one of the male and female members, the poppet valve axially slidable in the central bore of the member for blocking fluid flow between the pair of radial fluid passages when the poppet valve is in the closed position, and opening fluid flow between the pair of radial fluid passages when the poppet valve is in the open position, the fluid flow being in a direction substantially perpendicular to the axial sliding of the poppet valve.

2. The undersea hydraulic coupling of claim 1 further comprising a poppet valve in each of the male and female members, and a valve actuator on each poppet valve, each valve actuator being positioned for contact with the opposing valve actuator to slide the poppet valve into the open position.

3. The undersea hydraulic coupling of claim 1 wherein at least a portion of the poppet valve has a body portion having an outer diameter narrower than the central bore to provide an annular cavity for fluid flow between the pair of radial fluid passages when the poppet valve is in the open position.

4. The undersea hydraulic coupling of claim 1, wherein the male member has a leading face and an outer circumference, and one of the radial fluid passages in the male member extends from the central bore to the outer circumference of the male member, and one of the radial fluid passages in the female member is interconnected to the receiving chamber, the fluid passages in the male and female members being mutually positioned to provide fluid flow between the members without fluid pressure against the leading face of the male member.

5. The undersea hydraulic coupling of claim 3, further comprising a plurality of elastomeric seals between the poppet valve and the central bore in which the poppet valve is positioned, at least two of the seals being positioned to seal each side of the annular cavity to prevent leakage during fluid flow between the pair of radial passages.

6. The undersea hydraulic coupling of claim 1, further comprising a plurality of pressure-energized metal seals to seal between the poppet valve and the central bore in which the poppet valve is positioned.

7. The undersea hydraulic coupling of claim 1, wherein the poppet valve comprises a plurality of grooves in its outer circumference for positioning ring-shaped seals therein for sealing with the central bore.

8. A member of an underseal hydraulic coupling, comprising:
   (a) a body portion having an outer circumference and a central bore extending therethrough;
   (b) first and second radial passages extending radially outwardly from the central bore, the radial passages spaced axially from each other;
   (c) a poppet valve slidable between an open and closed position in the central bore, the poppet valve dimensioned to provide a cavity between the poppet valve and central bore, the cavity extending axially between the first and second radial passages when the poppet valve is in the open position;

(d) a longitudinal passage connected to one of the radial passages providing a fluid path to one of the radial passages; and (e) seal means for blocking fluid flow through the central bore and diverting fluid flow to the longitudinal passage.

9. The hydraulic coupling member of claim 8, further comprising a pair of seals to seal each end of the cavity during fluid flow therethrough.

10. The hydraulic coupling member of claim 8, further comprising a valve actuator extending axially from the poppet valve, the valve actuator being movable to urge the poppet valve into the open position.

11. The hydraulic coupling member of claim 8, further comprising a poppet valve spring to urge the poppet valve into the closed position.

12. The hydraulic coupling member of claim 8 further comprising a vent passage from the central bore to the outer circumference of the body portion, to vent fluid trapped in the central bore during connection of the hydraulic coupling member to an opposing member.

13. The hydraulic coupling member of claim 8, wherein one of the radial passages extends from the central bore to the outer circumference of the member.

* * * * *

UNITED STATES PATENT AND TRADEMARK OFFICE
CERTIFICATE OF CORRECTION

PATENT NO. : 5,360,035
DATED : November 1, 1994
INVENTOR(S) : Robert E. Smith, III It is certified that error appears in the above-indentified patent and that said Letters Patent is hereby corrected as shown below:

Column 8, line 56, "underseal" should be --undersea--.

Signed and Sealed this

Twenty-fourth Day of January, 1995

Attest:

BRUCE LEHMAN

Attesting Officer    Commissioner of Patents and Trademarks